United States Patent
Zhang et al.

(10) Patent No.: US 11,839,845 B2
(45) Date of Patent: *Dec. 12, 2023

(54) AIR-FILTER MEDIA COMPRISING A RELOFTED SPUNBONDED WEB, AND METHODS OF MAKING AND USING

(71) Applicant: 3M INNOVATIVE PROPERTIES COMPANY, St. Paul, MN (US)

(72) Inventors: Zhiqun Zhang, North Oaks, MN (US); Edward Keith Willis, Goodlettsville, TN (US); Jacob J. Thelen, Minneapolis, MN (US); Daniel E. Johnson, Marine On St. Croix, MN (US); Bryan L. Gerhardt, Woodbury, MN (US); Michael R. Berrigan, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 485 days.

This patent is subject to a terminal disclaimer.

(21) Appl. No.: 17/263,875

(22) PCT Filed: Jul. 19, 2019

(86) PCT No.: PCT/IB2019/056213
§ 371 (c)(1),
(2) Date: Jan. 27, 2021

(87) PCT Pub. No.: WO2020/026062
PCT Pub. Date: Feb. 6, 2020

(65) Prior Publication Data
US 2021/0229012 A1    Jul. 29, 2021

Related U.S. Application Data

(60) Provisional application No. 62/714,188, filed on Aug. 3, 2018.

(51) Int. Cl.
*B01D 46/52* (2006.01)
*B01D 39/16* (2006.01)
(Continued)

(52) U.S. Cl.
CPC ..... *B01D 39/1623* (2013.01); *B01D 46/0001* (2013.01); *B01D 46/0005* (2013.01);
(Continued)

(58) Field of Classification Search
CPC ............ B01D 39/1623; B01D 46/0001; B01D 46/0005; B01D 46/0032; B01D 46/521;
(Continued)

(56) References Cited

U.S. PATENT DOCUMENTS 4,517,714 A    5/1985  Sneed
5,240,764 A    8/1993  Haid
(Continued)

FOREIGN PATENT DOCUMENTS

CN    206715518 U    12/2017
EP    3290014    3/2018
(Continued)

OTHER PUBLICATIONS

"Performance and Fit, Nonwovens Industry Magazine" 2013, 9 pages; Retrieved from internet on Mar. 29, 2021, URL <https://www.nonwovens-industry.com/issues/2013-01/view_features/performance-and-fit>.
(Continued)

*Primary Examiner* — Frank M Lawrence, Jr.
(74) *Attorney, Agent, or Firm* — Kenneth B. Wood

(57) ABSTRACT

A relofted, spunbonded nonwoven web exhibiting a solidity of from less than 8.0%, to at least 3.0%, and exhibiting a Quality Factor of at least 0.30. Methods of making a relofted
(Continued)

web; and, methods of using a relofted web as an air-filtration web, e.g. as a filter media or a layer thereof.

23 Claims, 9 Drawing Sheets

(51) Int. Cl.
*B01D 46/00* (2022.01)
*D04H 3/033* (2012.01)
*D04H 3/16* (2006.01)
*D06C 15/02* (2006.01)
*D06C 15/08* (2006.01)

(52) U.S. Cl.
CPC ....... *B01D 46/0032* (2013.01); *B01D 46/521* (2013.01); *D04H 3/033* (2013.01); *D04H 3/16* (2013.01); *D06C 15/02* (2013.01); *D06C 15/08* (2013.01); *B01D 2239/0208* (2013.01); *B01D 2239/0435* (2013.01); *B01D 2239/0618* (2013.01); *B01D 2239/0627* (2013.01); *B01D 2239/10* (2013.01); *B01D 2239/1266* (2013.01); *D10B 2505/04* (2013.01)

(58) Field of Classification Search
CPC .... B01D 2239/0208; B01D 2239/0435; B01D 2239/0618; B01D 2239/0627; B01D 2239/10; B01D 2239/1266; B01D 2239/1216; D04H 3/033; D04H 3/16; D04H 3/02; D04H 3/14; D06C 15/02; D06C 15/08; D10B 2505/04
USPC .............................. 55/521, 527, 528, DIG. 5
See application file for complete search history.

(56) References Cited

U.S. PATENT DOCUMENTS

| | | | |
|---|---|---|---|
| 5,641,555 A * | 6/1997 | Berrigan | D04H 1/43838 428/167 |
| 5,662,728 A | 9/1997 | Groeger | |
| 5,928,973 A | 7/1999 | Daniel | |
| 6,321,425 B1 | 11/2001 | Putnam | |
| 6,858,297 B1 | 2/2005 | Shah | |
| 6,903,034 B1 | 6/2005 | Putnam | |
| 7,015,158 B2 | 3/2006 | Pearce | |
| 7,691,760 B2 | 4/2010 | Bergsten | |
| 8,162,153 B2 | 4/2012 | Fox | |
| 8,240,484 B2 | 8/2012 | Fox | |
| 8,425,729 B2 | 4/2013 | Skoog | |
| 8,454,780 B2 | 6/2013 | Anderson | |
| 8,512,607 B2 | 8/2013 | Pedoja | |
| 8,613,795 B2 | 12/2013 | Li | |
| 8,790,449 B2 | 7/2014 | Li | |
| 9,067,357 B2 | 6/2015 | Orr | |
| 9,731,237 B2 | 8/2017 | Ng | |
| 9,976,771 B2 | 5/2018 | Chen | |
| 2004/0131820 A1 | 7/2004 | Turner | |
| 2006/0084344 A1 | 4/2006 | Bonneh | |
| 2008/0038976 A1 | 2/2008 | Berrigan | |
| 2010/0031618 A1* | 2/2010 | Grove, III | B01D 39/163 162/123 |
| 2010/0159775 A1 | 6/2010 | Chamber, Jr. | |
| 2010/0252047 A1* | 10/2010 | Kirk | D06M 10/06 442/400 |
| 2011/0000845 A1 | 1/2011 | Fox | |
| 2011/0250378 A1 | 10/2011 | Eaton | |
| 2012/0017910 A1 | 1/2012 | Li | |
| 2013/0112625 A1* | 5/2013 | Bahukudumbi | C02F 1/285 442/268 |
| 2016/0067647 A1 | 3/2016 | Tate | |
| 2016/0206984 A1 | 7/2016 | Berrigan | |
| 2017/0241054 A1 | 8/2017 | Song | |
| 2021/0308610 A1* | 10/2021 | Cheng | B01D 46/0001 |

FOREIGN PATENT DOCUMENTS

| | | |
|---|---|---|
| JP | 2008-057053 | 3/2008 |
| WO | 20100151542 | 12/2010 |
| WO | 2016032930 | 3/2016 |
| WO | WO 2017-213926 | 12/2017 |
| WO | WO 2020-026152 | 2/2020 |

OTHER PUBLICATIONS

International Search report for PCT International Application No. PCT/IB2019/056213 dated Oct. 15, 2019, 3 pages.

* cited by examiner

AIR-FILTER MEDIA COMPRISING A RELOFTED SPUNBONDED WEB, AND METHODS OF MAKING AND USING

BACKGROUND

Air-filter media are widely used for the purpose of removing particulate matter from air.

SUMMARY

In broad summary, herein is disclosed is a relofted, spunbonded nonwoven web exhibiting a solidity of from less than 8.0%, to at least 3.0%, and exhibiting a Quality Factor of at least 0.30. Methods of making a relofted web are also disclosed. The use of a relofted web as an air-filtration web, e.g. as a filter media or a layer thereof, are also disclosed. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
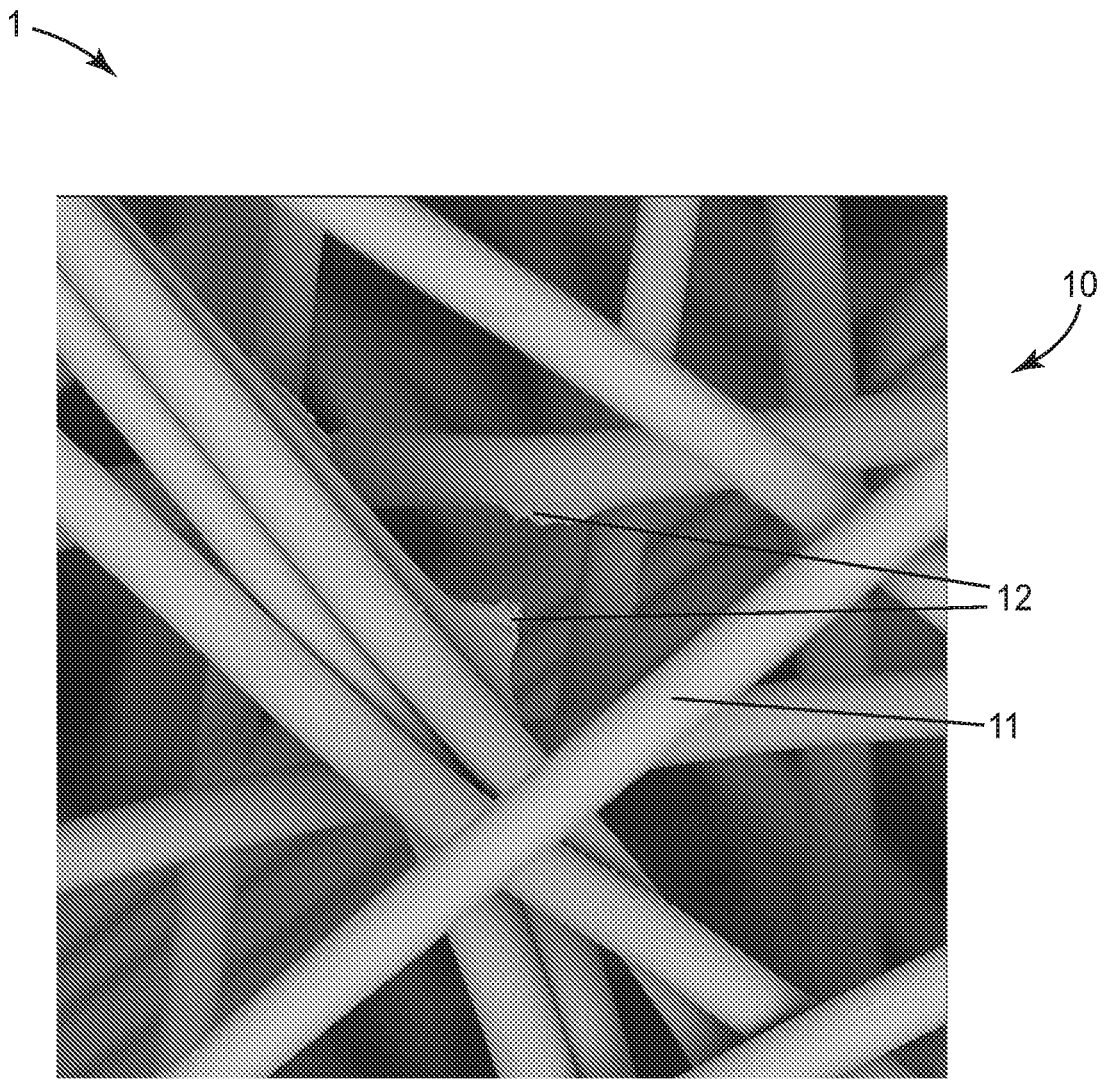
FIG. 1 is a scanning electron micrograph at 1150 times magnification in top view, of a portion of an exemplary relofted, spunbonded nonwoven web.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. As used herein, terms such as "essentially free of", and the like, do not preclude the presence of some extremely low, e.g. 0.1% or less, amount of material, as may occur e.g. when using large scale production equipment subject to customary cleaning procedures. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

The term "spunbonded" refers to a nonwoven web comprised of meltspun fibers, at least some of which fibers exhibit fiber-fiber bonds e.g. as provided by autogenous bonding as described later herein.

The term "meltspun" refers to fibers that are formed by extruding filaments out of a set of orifices and allowing the filaments to cool and solidify to form fibers, with the filaments passing through an air space (which may contain streams of moving air) to assist in cooling the filaments and passing through an attenuation (i.e., drawing) unit to at least partially draw the filaments.

The term "solidity" denotes a dimensionless fraction (usually reported in %) that represents the proportion of the total volume of a fibrous web that is occupied by the solid (e.g. polymeric fibrous) material. Further explanation, and methods for obtaining solidity, are found in the Examples section. Loft is 100% minus solidity and represents the proportion of the total volume of the web that is unoccupied by solid material.

The term "Quality Factor" is a figure of merit for the overall performance of a filter media in filtering particles from air, and is defined and discussed later herein.

The term "self-supporting" denotes a spunbonded web (whether or not it has been relofted) that exhibits sufficient mechanical integrity to be handled and subjected to conventional web handling processes (e.g. winding, unwinding, and the like).

Disclosed herein is an air-filter media comprising a relofted, spunbonded nonwoven web exhibiting a solidity of from less than 8.0% to at least 3.0% and exhibiting a Quality Factor of at least 0.30. The term "spunbonded" refers to a nonwoven web comprised of meltspun fibers, at least some of which fibers exhibit fiber-fiber bonds e.g. as provided by autogenous bonding as described later herein. The term "meltspun" refers to fibers that are formed by extruding filaments out of a set of orifices and allowing the filaments to cool and solidify to form fibers, with the filaments passing through an air space (which may contain streams of moving air) to assist in cooling the filaments and passing through an attenuation (i.e., drawing) unit to at least partially draw the filaments. Meltspinning can be distinguished from meltblowing in that meltblowing involves the extrusion of filaments into converging high velocity air streams introduced by way of air-blowing orifices located in close proximity to the extrusion orifices.

Figure 2:
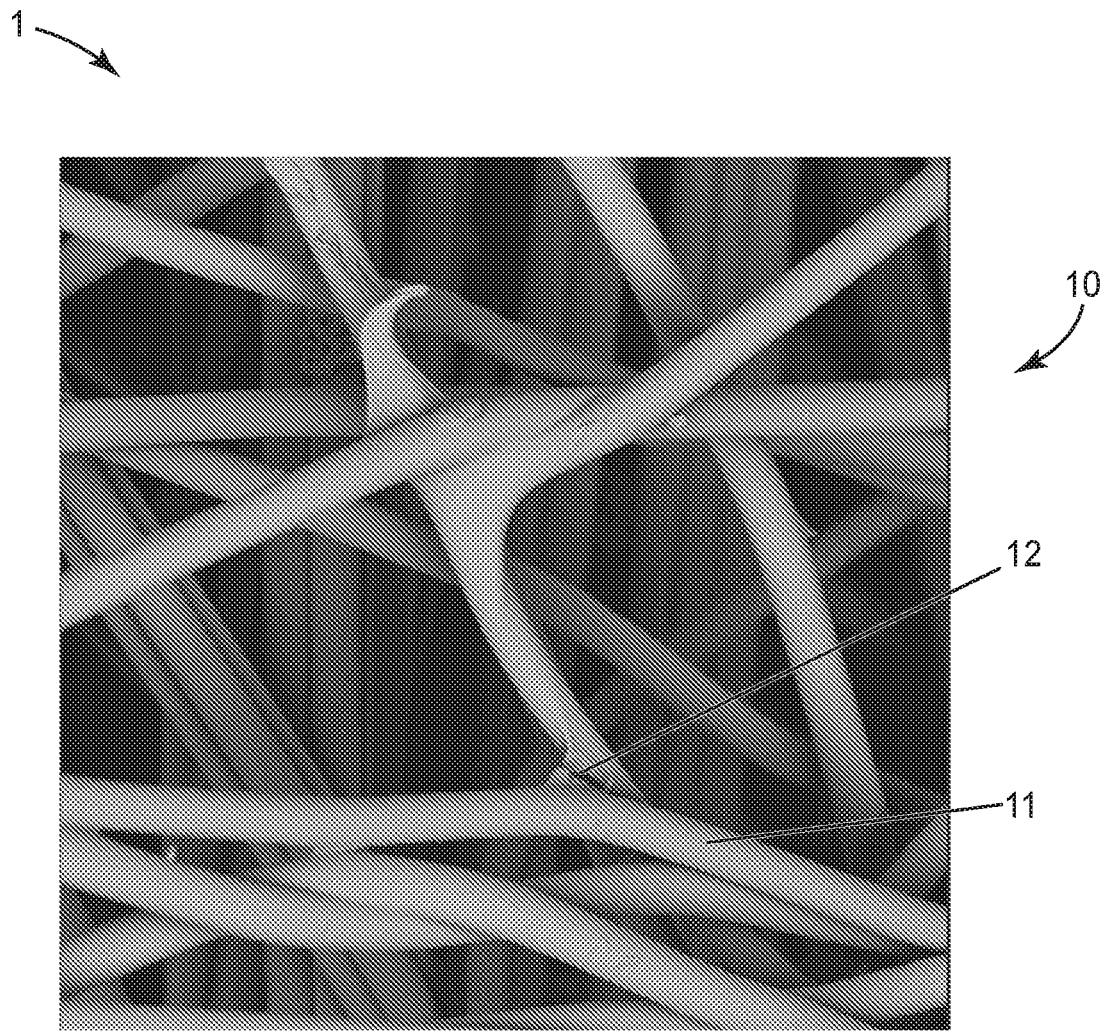
FIG. 2 is a scanning electron micrograph at 830 times magnification in top view, of a portion of another exemplary relofted, spunbonded nonwoven web.

Web 10 is a relofted spunbonded web. The term "relofted" denotes a spunbonded nonwoven web that has been subjected to a post-processing step that increases the loft (lowers the solidity) of the spunbonded nonwoven web. By definition, a relofted web will be self-supporting as defined above. A relofted spunbonded web can be identified, and distinguished from spunbonded webs that are not relofted, at least by the presence of broken fiber-fiber bonds, as discussed in detail later herein. Exemplary broken fiber-fiber bonds 12 of fibers 11 of relofted webs 10, are pointed out in the scanning electron microscope photographs presented in FIGS. 1 and 2.

A relofting process, particularly when performed on a spunbonded precursor web that already comprises a high loft (i.e., as manifested as a solidity of under 10%), has been found to impart significant advantages. For example, a relofted spunbonded web may exhibit a significant decrease (e.g., of up to 50%) in airflow resistance (as manifested by a Pressure Drop measurement as discussed in the Examples section herein) relative to the precursor spunbonded web. However, the relofted spunbonded web may exhibit only a rather small increase in the ability of airborne particulates to penetrate through the web (as manifested by a Percent Penetration measurement as discussed in the Examples section herein). This advantageous combination of properties is captured by the Quality Factor, which is a well-known figure of merit that is often used for air filter media and which takes into account both Pressure Drop and Percent Penetration, as discussed in the Examples section herein. Relofting a high-loft spunbonded web has been found to significantly enhance (increase) the Quality Factor (e.g. by a factor of up to 50, 70, or even 90% or more), which is a surprising result considering that high-loft spunbonded webs often exhibit a relatively high Quality Factor to begin with. Still further, relofted spunbonded webs have been found to exhibit significantly enhanced Dust Holding Capacity, as evidenced in the Working Examples herein.

Relofted web 10 is produced by post-processing a precursor spunbonded web 9. An exemplary precursor spunbonded web 9 is shown in an optical photograph in FIG. 3. Precursor web 9 comprises meltspun fibers 11. From the definition and description of meltspun fibers provided above, it will be clear that meltspun fibers and the resulting spunbonded webs can be distinguished from meltblown webs (e.g. by way of the molecular orientation imparted to meltspun fibers during the attenuation process). Meltspun fibers can also be distinguished from staple fibers, which are typically cut to a desired length, in contrast to meltspun fibers which are typically continuous except for occasional, statistically-occurring fiber breaks. Meltspun fibers and spunbonded webs can also be distinguished from e.g. carded webs (which typically exhibit a noticeable fiber alignment imparted by the carding process, that is not present in spunbonded webs), and also airlaid webs, wetlaid webs, and so on.

Meltspun fibers 11 can be made from any suitable organic polymeric material that is able to be meltspun. In various embodiments, such fibers may be comprised of polyolefins (e.g., polypropylene, polyethylene, etc.), poly(ethylene terephthalate), nylon, and copolymers and/or blends of any of these. In some embodiments, at least some, or all, of meltspun fibers 11 are monocomponent fibers. The term "monocomponent" refers to the organic polymeric material of a fiber and denotes a fiber in which a continuous phase of uniform polymeric composition extends across the cross-section and over the length of the fiber. In some convenient embodiments, a monocomponent fiber may be a polypropylene fiber. The term monocomponent does not necessitate that the organic polymeric component material is the only component of the fiber. Rather, in various embodiments, any suitable additive, e.g. one or more of antioxidants, plasticizers, processing aids, and so on, may be present for any desired purpose. In particular embodiments, the fiber may include a charging additive for the purpose of allowing a stable electric charge (an "electret") to be imparted to the fiber.

A monocomponent fiber as defined and described above excludes multicomponent fibers such as bicomponent fibers. However, in alternative embodiments, at least some, or all, of meltspun fibers 11 may be multicomponent fibers comprising at least two phases of differing organic polymeric compositions. Such fibers may have any suitable configuration, chosen from e.g. sheath-core, side-by-side, islands-in-the-sea, and so on. In some embodiments, such fibers may include at least one organic polymeric phase with a composition that promotes or enhances bonding, e.g. melt-bonding, of the meltspun fibers to each other. Multicomponent fibers may suitably include any of the above-mentioned additives, e.g. charging additives, in at least one of the phases of the fiber.

Meltspun fibers may be generated (e.g. extruded, solidified and attenuated) and collected using any suitable melt-spinning method. In some embodiments, apparatus and methods may be used that are presented in U.S. Pat. No. 8,240,484, which is incorporated by reference herein in its entirety. As described in detail in the '484 patent, the approaches disclosed therein can allow the formation of precursor meltspun webs that exhibit a relatively high loft, e.g. as manifested by a solidity of less than e.g. 8.0%.

Meltspun fibers may have any suitable average diameter, e.g. as determined by optical inspection of a statistically meaningful number of fibers. In various embodiments, the meltspun fibers may exhibit an average fiber diameter of at least 1, 2, 4, 6, 10, 15 or 20 microns; in further embodiments the meltspun fibers may exhibit an average fiber diameter of at most 50, 40, 30, 25, 18 or 12 microns. In many embodiments, the meltspun fibers will exhibit a fiber diameter distribution that is unimodal; that is, in such embodiments precursor web 9 and relofted web 10 derived therefrom will not comprise a composite mixture that exhibits distinct populations of e.g. fine and coarse fibers. (It is noted that in general, fiber properties such as e.g. fiber diameter as described herein, will be understood to apply to both precursor web 9 and relofted web 10 derived therefrom.)

Precursor web 9 (and relofted web 10 derived therefrom) is a spunbonded web, meaning a web that comprises at least some fiber-fiber bonds. By a fiber-fiber bond is meant a bond (e.g., a melt-bond) between a small number of fibers (typically five or less; in most cases, two) at a location at which the fibers are in contact with each other. In a fiber-fiber bond, each fiber substantially retains its individual character (e.g. appearance and shape). By definition, fiber-fiber bonds are distinguished from multi-fiber bonds in which large numbers of fibers are bonded to each other, which may be optionally present and are discussed later herein. In many embodiments the fiber-fiber bonds are autogenous bonds. By this is meant fiber-fiber melt bonds obtained by subjecting a collection of meltspun fibers to an elevated temperature (e.g., as achieved by use of an oven and/or a stream of controlled-temperature air) without the application of solid contact pressure onto the web. In some embodiments, such bonding may be so-called through-air bonding performed by directing of heated air onto and through the web, e.g. by the use of a controlled-heating device as discussed in detail in U.S. Patent Application No. 2008/0038976, which is incorporated by reference herein in its entirety for this purpose. In particular embodiments the bonding may be performed by use of apparatus and methods disclosed in U.S. Pat. No. 9,976,771, which is incorporated by reference herein in its entirety for this purpose. It will be appreciated that autogenous bonding, e.g. through-air bonding, can bond fibers to each other to form a self-supporting web without significantly compacting or densifying (e.g. crushing or otherwise significantly reducing the loft of) the web. Autogenous bonding and the resulting bonds are thus distinguished from e.g. bonding performed by calendering, ultrasonic bonding, and like processes. In some embodiments, the fiber-fiber bonding may be between monocomponent fibers (e.g. as described in the '771 patent); in other embodiments, the fiber-fiber bonding may be between particular components of multicomponent (e.g. bicomponent) fibers.

In some embodiments, a spunbonded precursor web, and thus a relofted web derived therefrom, may optionally comprise (in addition to the above-described fiber-fiber bonds) multi-fiber area-bonds of the type exemplified by bonds achieved by calendering, ultrasonic bonding or the like. Exemplary calendered area-bonds 14 are visible in the optical photograph of FIG. 3. As is characteristic of such area-bonds, each bond 14 is seen to comprise numerous (e.g. ten or more) fiber segments that have been melted and consolidated together over a relatively wide area so as to substantially lose their individual character (appearance and shape) in the bonded area. In some embodiments, a spunbonded web may include a relatively low level of such area-bonds; such a level may enhance the mechanical integrity of the web without significantly adversely affecting the properties (e.g. the filtration performance) of the web. In various embodiments, such area-bonds may be present in a precursor web or in a relofted web derived therefrom, at an area percentage of the web that is greater than 0% but is less than 5.0, 4.0, 3.0, 2.5, 2.0, 1.5, 1.0, or 0.5%. By way of a specific example, the web of FIG. 3 comprises multi-fiber area-bonds that appear to be present at an area percentage estimated to be in the range of 1.3-1.5%.

In various embodiments, a precursor spunbonded nonwoven web from which a relofted web is derived, may exhibit a solidity (as an average value) of no more than 10.0, 9.0, 8.0, or 7.0%. In some embodiments, a precursor spunbonded nonwoven web from which a relofted web is derived may include at least some fibers to which an electric charge (e.g. a quasi-permanent charge commonly referred to as an electret) has been imparted. In various embodiments, the web may be e.g. corona charged or hydrocharged. It will be appreciated that in such embodiments, any subsequent relofting process should be performed so that it does not unacceptably diminish the electret charges. Methods of charging fibers and webs, and additives that can enhance the ability of fibers to receive and retain charges, are disclosed e.g. in U.S. Pat. Nos. 8,613,795 and 8,790,449 and in US Patent Application Publication No. 2016/0206984, all of which are incorporated by reference herein in their entirety for this purpose.

A relofting process as disclosed herein may be performed on any suitable spunbonded web. Spunbonded webs that may be particularly suitable include e.g. those of the general type described in U.S. Patent Application Publication 20080038976 to Berrigan. Any such media can be charged to form an electret, if desired. In some embodiments, a spunbonded web may be a high-loft spunbonded web. As used herein, this signifies a web that exhibits a solidity of less than 10.0%. Particular high-loft spunbonded webs (e.g. with a solidity of less than 8.0%) that may be suitable for relofting, and methods of making such webs, are disclosed in U.S. Pat. No. 8,162,153 to Fox, which is incorporated by reference herein in its entirety.

Precursor spunbonded web 9 is subjected to a relofting process to form relofted web 10. As noted earlier, a relofting process is a post-processing step that is applied to a precursor spunbonded web to increase the loft (lower the solidity) of the web. In this process, a significant percentage (e.g., greater than 5%) of the above-described fiber-fiber bonds are broken so that broken bonds 12 are visible e.g. as in FIGS. 1 and 2. Those of ordinary skill will readily appreciate that a small number of broken fiber-fiber bonds may occur in the conventional handling and processing of a spunbonded web. However, those of ordinary skill in the art of producing and handling spunbonded webs will readily understand that such phenomena, as may occasionally occur statistically in any real-life web-production process, will be distinguishable from the present instance in which a significant percentage of the fiber-fiber bonds are purposefully broken in order to increase the loft of the web.

A spunbonded web can be identified as relofted e.g. by virtue of the presence of a significant number of fiber-fiber bonds that have been broken. A relofted web may exhibit other identifying features. For example, in a relofted web at least some of the fibers have been physically moved, separated from each other, deformed, rearranged, or the like, so that the web may exhibit a more fibrillated appearance. In other words, a relofted web may be visibly more "fuzzy" than the precursor web from which it was derived. Indeed a relofted web may be more "fuzzy" than typical spunbonded webs on casual visual inspection.

Figure 3:
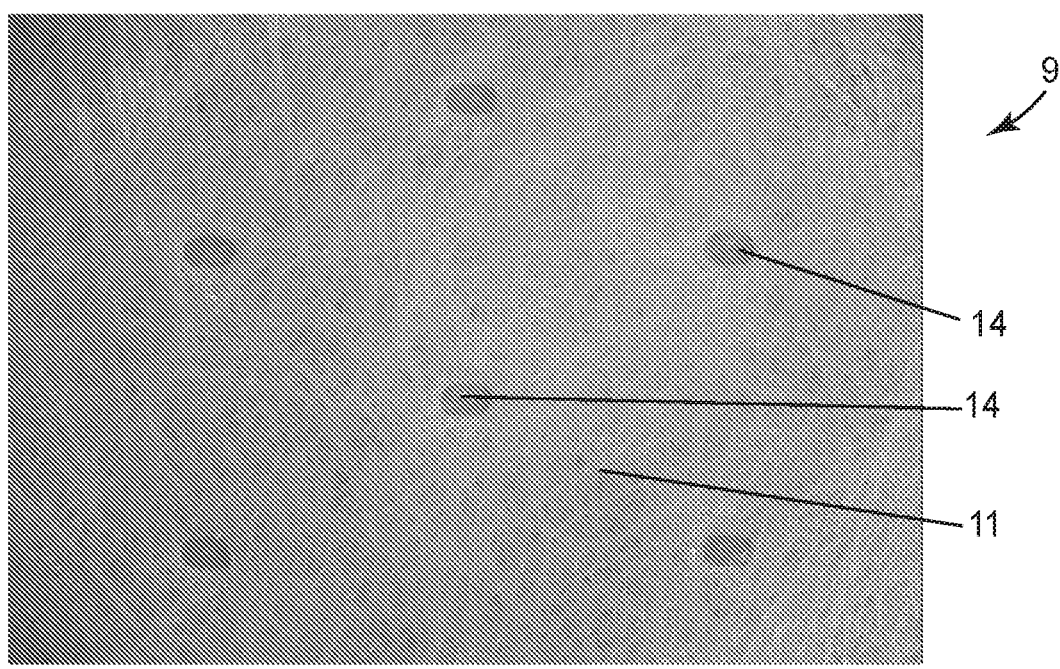
FIG. 3 is an optical photograph at 20 times magnification in top view, of a portion of an exemplary precursor spunbonded nonwoven web from which a relofted web may be obtained.
Figure 4:
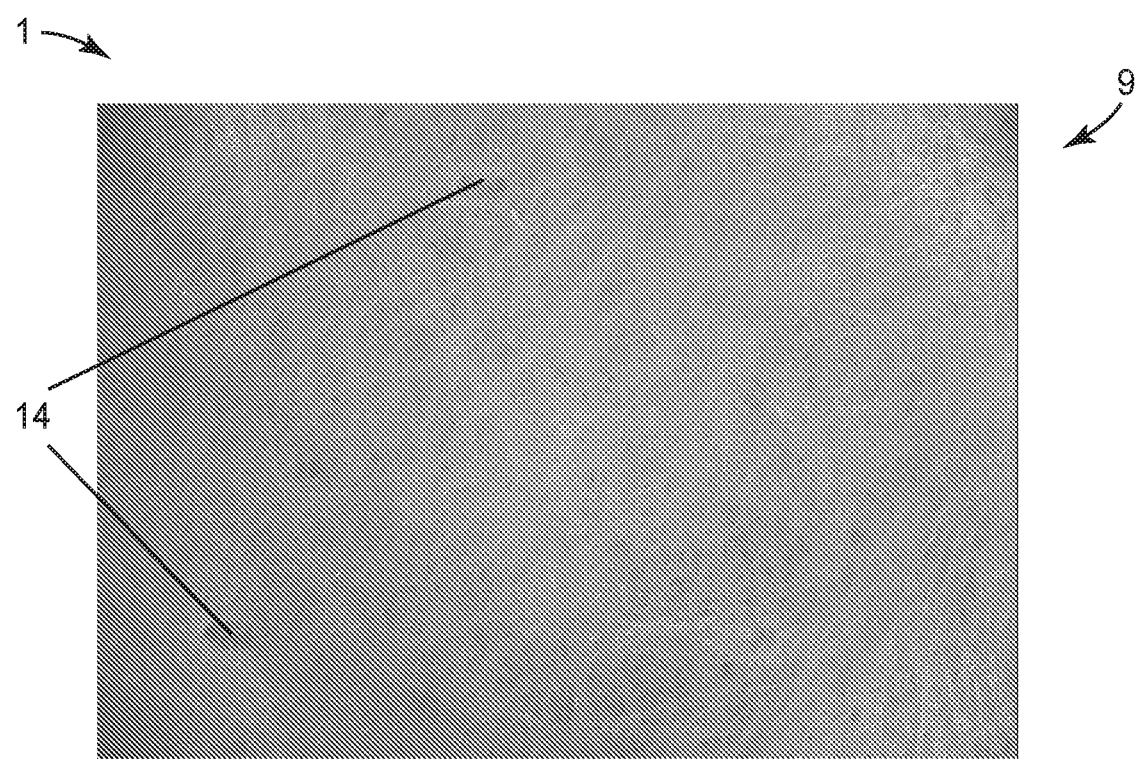
FIG. 4 is an optical photograph at 20 times magnification in top view, of a portion of an exemplary relofted, spunbonded nonwoven web.

Such a property can be particularly evident in embodiments in which the web comprises optional multi-fiber area bonds. As evidenced by precursor web 9 as shown in FIG. 3, in a typical spun-bonded web any multi-fiber area-bonds 14 are easily observable as flattened areas within which the fibers have lost their individual identity, with very few of no individual fibers overlying the bonded area. As shown in FIG. 4, a relofted web derived from such a precursor web may have had at least some of its fibers rearranged so that some, or most, of the area-bonds are at least partially obscured by overlying fibers.

In some cases, at least some fibers of a relofted web may exhibit characteristics (e.g. stress whitening, stress cracking, crazing, orientation, necking, and so on) that are indicative of the fibers being exposed to significant shear commensurate with a relofting process. Ordinary artisans will thus appreciate that a relofted spunbonded web may be identified by any or all of several characteristics, of individual fibers and/or of the web as a whole, that result from the relofting process.

In one general approach, a precursor spunbonded nonwoven web is relofted by being mechanically worked. By "working" and "worked" is meant a process of subjecting at least some areas of the web to a shearing force applied by passing the web through a nip between a pair of intermeshing rolls. The term "intermeshing" rolls denotes first and second rolls configured and mated so that as the rolls rotate, at least some radially-outwardly-protruding forming elements of the first roll extend toward the second roll so that radially outwardmost (relative to the first roll) surfaces of these forming elements are positioned radially inward (toward the second roll) of a local imaginary boundary defined by radially-outwardmost (relative to the second roll) surfaces of the second roll. In other words, a pair of intermeshing rolls will comprise at least some "male" forming elements that protrude radially outwardly from one of the rolls, and will comprise at least some "female" forming elements that are recessed radially inwardly from the surface of one of the rolls, each female forming element being configured to at least partially receive a male forming element radially inward thereinto. The concept of "intermeshing" rolls will be well understood by ordinary artisans.

Passing a precursor spunbonded nonwoven web through a nip between intermeshing rolls in the manner described herein will apply shearing force to at least some areas of the web, which will result in these areas being mechanically worked (sheared), thus disrupting at least some of the fiber-fiber bonds to the point of breaking the bonds and locally increasing the loft of the web at least in these areas. While, as discussed later herein, such shearing force may be applied in a pattern over the length and/or breadth of the web, the pattern and area coverage can be such that the relofted web will exhibit desired properties in an overall manner, averaged over a macroscopic area (e.g. of at least 10 square cm) of the web. Thus, properties such as solidity, Percent Penetration of particles, Pressure Drop, Quality Factor, and so on, will be understood to be average properties taken over a suitable macroscopic area of the relofted web. The term "relofted" thus requires that at least 30% of the area of the web has been worked/locally relofted in this manner, so that the overall enhancements in e.g. Quality Factor for the web as a whole may be obtained. In various embodiments, at least about 40, 60, 80, 90, 95, 98, or essentially 100% of the area of the web may be worked/locally relofted.

The forming elements of the first and second intermeshing rolls can be configured in any suitable manner. In one general approach, each roll will comprise forming elements that are parallel, elongated ridges that protrude radially outwardly from the roll, the parallel ridges being interspersed with forming elements that are parallel elongated valleys. Such an arrangement will provide a working pattern that will be termed herein as being one-dimensional and continuous.

In some embodiments, such ridges will exhibit long axes that extend transversely across the roll and are thus aligned with the crossweb axis of the precursor web as it is processed by the rolls. An example of such an arrangement is shown in perspective view in exemplary embodiment in FIG. 5. Another pair of rolls of this general type is shown in side view in FIG. 6 in order to illustrate the intermeshing nature of such rolls.

Figure 5:
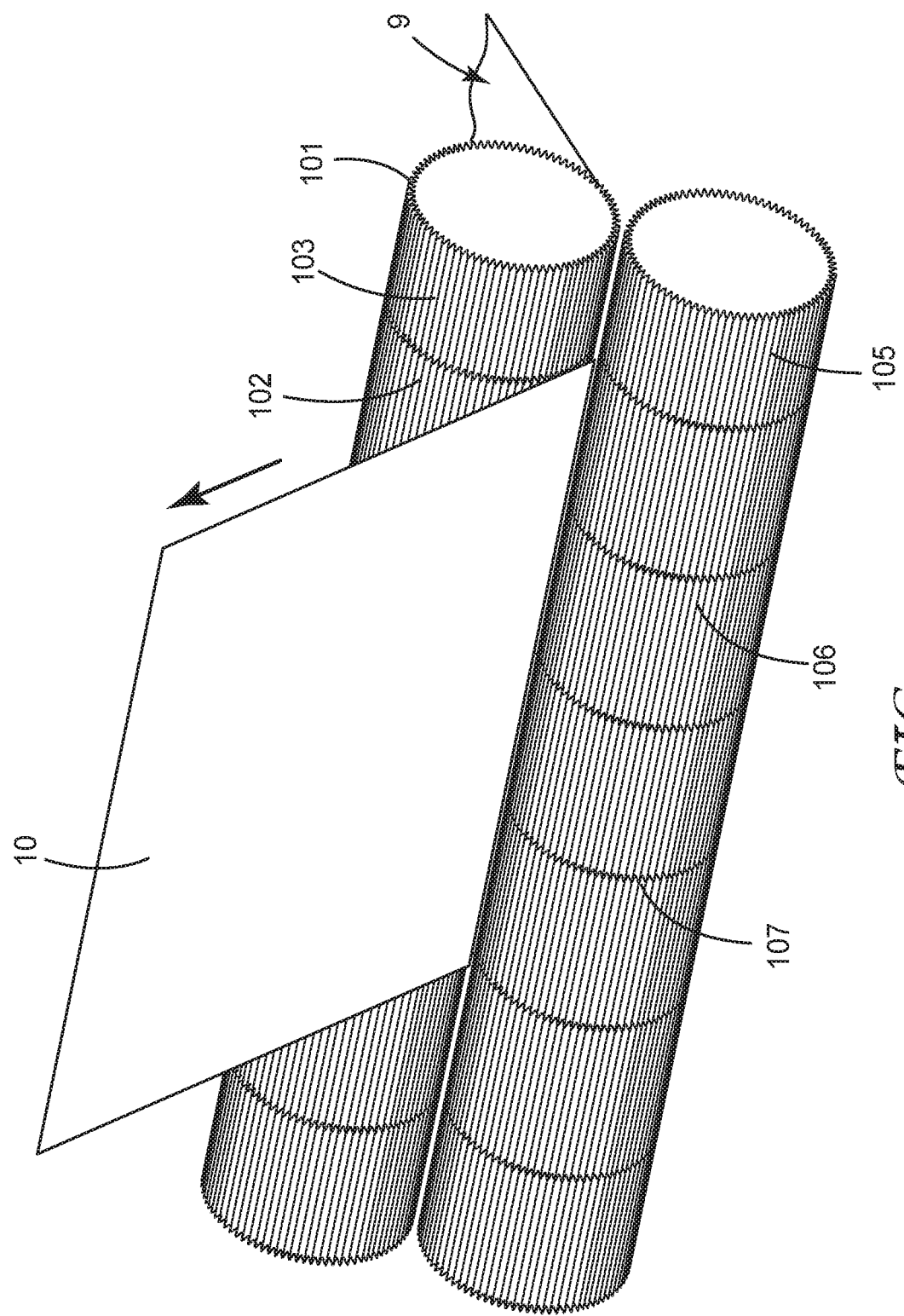
FIG. 5 is a perspective view of an exemplary pair of tool rolls useful for relofting a spunbonded nonwoven web.
Figure 6:
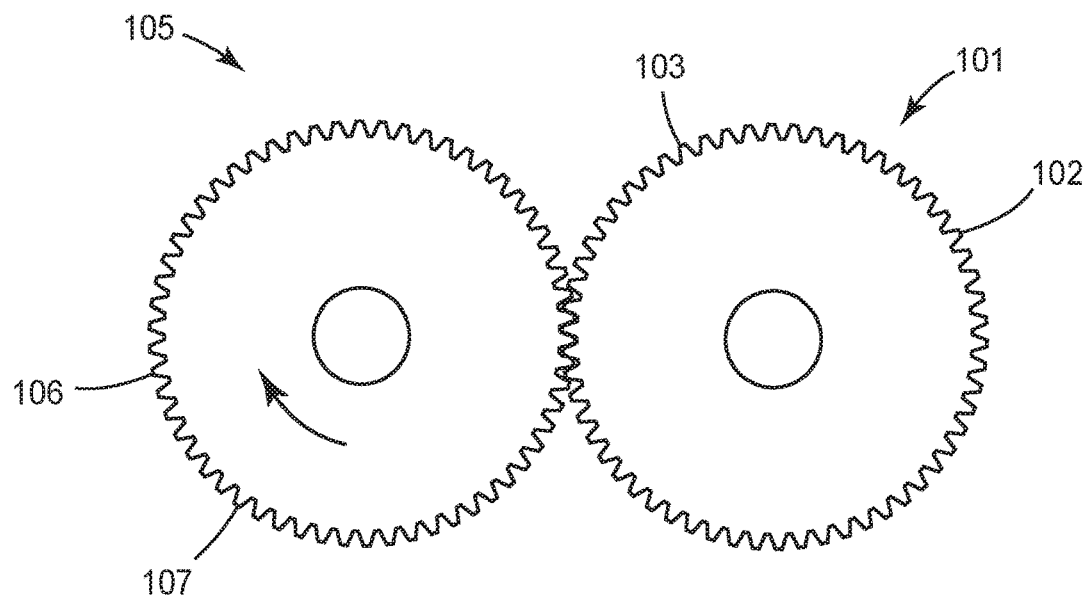
FIG. 6 is a side view of an exemplary pair of intermeshing rolls of the general type depicted in FIG. 5.

In further detail with reference to FIG. 5, a precursor web 9 may be passed through a nip between a first roll 101 comprising ridges 102 and valleys 103, and a second roll 105 comprising ridges 106 and valleys 107, to produce a relofted web 10. It is emphasized that FIGS. 5 and 6 depict exemplary representations. Although the depicted relofting apparatus and process may resemble, for example, the use of conventional corrugating rolls, in many embodiments little or no permanent large-scale deformation of the web away from a planar condition may occur. In other words, a relofted web as produced by such a process will comprise relofted zones (e.g. crossweb stripes) that exhibit increased loft; however, in many instances the relofted web may still be relatively planar, or e.g. slightly undulating, in appearance rather than being permanently corrugated. In keeping with the remarks above, the relofted zones will occupy at least 30%, and may often occupy considerably more, of the area of the relofted web.

In some embodiments, such ridges will exhibit long axes that extend circumferentially around the roll and are thus aligned with the long (downweb) axis of the precursor web as it is processed by the rolls. An example of such an arrangement is shown in perspective view in exemplary embodiment in FIG. 7. Another pair of rolls of this general type is shown in side view in FIG. 8 in order to illustrate the intermeshing nature of such rolls. In further detail, a precursor web (omitted from FIGS. 7 and 8 for ease of viewing the rolls) may be passed through a nip between a first roll 201 comprising ridges 202 and valleys 203, and a second roll 205 comprising ridges 206 and valleys 207, to produce a relofted web. In this context, it is noted that such a "roll" may be in the form of a single cylinder with ridges protruding radially outward therefrom; or, it may be provided by multiple plates or rings that are attached to each other or that otherwise act collectively, in combination, to perform the mechanical working. Ordinary artisans will recognize that the latter arrangement is similar to those sometimes used for processing fibrous materials e.g. for use as diaper components and commonly referred to as "ring-rolling".

A relofted web as produced by such a process will comprise relofted zones (e.g. downweb stripes) that exhibit increased loft. The relofted zones will occupy at least 30%, and may often occupy considerably more, of the area of the relofted web. In similar manner as noted above, the relofted web will often be relatively planar, or e.g. slightly undulating, in appearance rather than being permanently macroscopically deformed.

In some embodiments, at least some of the forming elements of the first and/or second rolls may be configured so that the forming elements are discrete rather than extending continuously along the transverse axis of the roll or extending continuously circumferentially around the roll. For example, some such male forming elements may each take the form of a discrete protrusion that extends radially outwardly from a roll and that is configured to extend radially inward into, and be bounded on its sides by, a female forming element of the other roll. Such an arrangement will provide a working pattern that will be termed herein as two-dimensional and continuous.

Figure 9:
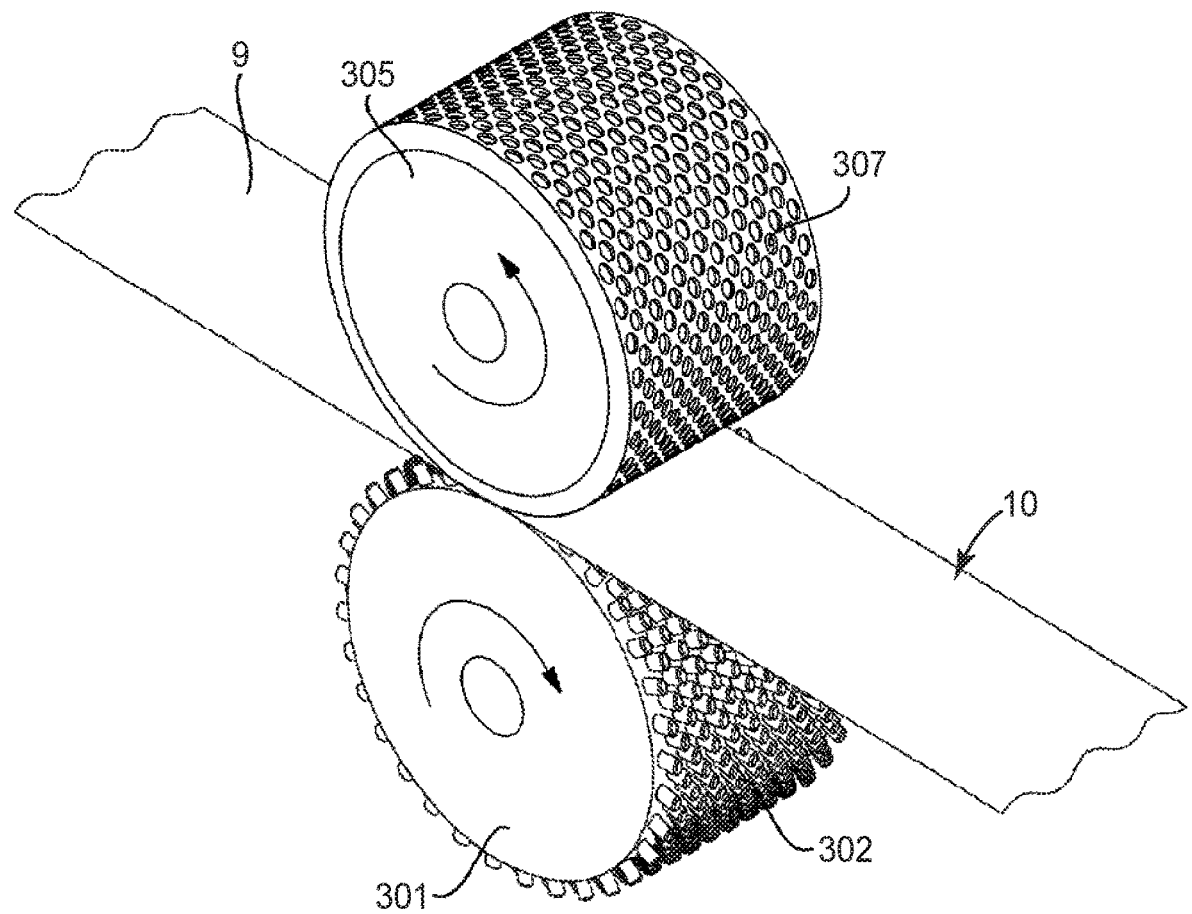
FIG. 9 is a perspective view of another exemplary pair of intermeshing rolls useful for relofting a spunbonded nonwoven web.

An example of such an arrangement is shown in perspective view in exemplary embodiment in FIG. 9. In further detail, a precursor web 9 may be passed through a nip between a first roll 301 comprising radially-outwardly-protruding male forming elements (e.g. posts) 302, and a second roll 305 comprising radially-inwardly-recessed female forming elements (e.g. cavities) 307, to produce a relofted web 10. It will be appreciated that FIG. 9 depicts an exemplary embodiment and that, for example, the shapes, sizes, and/or spacings of the complementary male and female forming elements may differ from the circular, uniformly-spaced elements of FIG. 9. Thus for example, any suitable shapes may be used, including but not limited to rectangular, square, oval, triangular, diamond, pentagonal, hexagonal, and so on. The elements do not necessarily have to have straight sidewalls (along a radially inward-outward direction); in fact, in many embodiments the sidewalls may be at least slightly sloped so that the posts and/or cavities are at least slightly tapered.

In some embodiments, at least some male elements may have radially outward surfaces that are relatively flat (although in some instances they may be curved to the extent of e.g. matching the curvature of the roll on which they are provided). In various embodiments, such male elements may each comprise a radially outward surface that ranges from e.g. 1, 2, 4, 8, 12, 16, or 20 square mm, to 400, 350, 300, 250, 200, 150, 100, 80, 60, 40 or 25 square mm, in area. Such elements may, but do not necessarily have to, exhibit a long axis that is oriented transversely across the roll or is oriented along a circumferential direction of the roll.

In various embodiments, male and female elements (whether discrete, or continuous as described earlier) may be configured so that they intermesh a radially-inward-outward distance of from at least 1, 2, 3, 4, 5, 6, or 7 mm, to at most 25, 20, 15, 12, 10, or 8 mm. In various embodiments, male and female elements (whether discrete, or continuous as described earlier) may be configured so that they when intermeshed they exhibit a distance of closest approach to each other of from at least 0.5, 1, 2, or 3 mm, to at most 5, 4, 3, 2 or 1 mm. With reference to elements 302 and 307 of FIG. 9, in some embodiments this distance of closest approach may occur along the sidewalls of the elements, noting that as discussed elsewhere herein, the purpose of the mechanical working process is to shear the precursor web to increase its loft, not to compress or crush the precursor web. In various embodiments, male and/or female element (whether discrete or continuous) may be provided at a pitch (spacing) of from at least 2, 3, 4, 5, 6, or 7 mm, to at most 25, 20, 15, 12, 10, or 8 mm.

Figure 10:
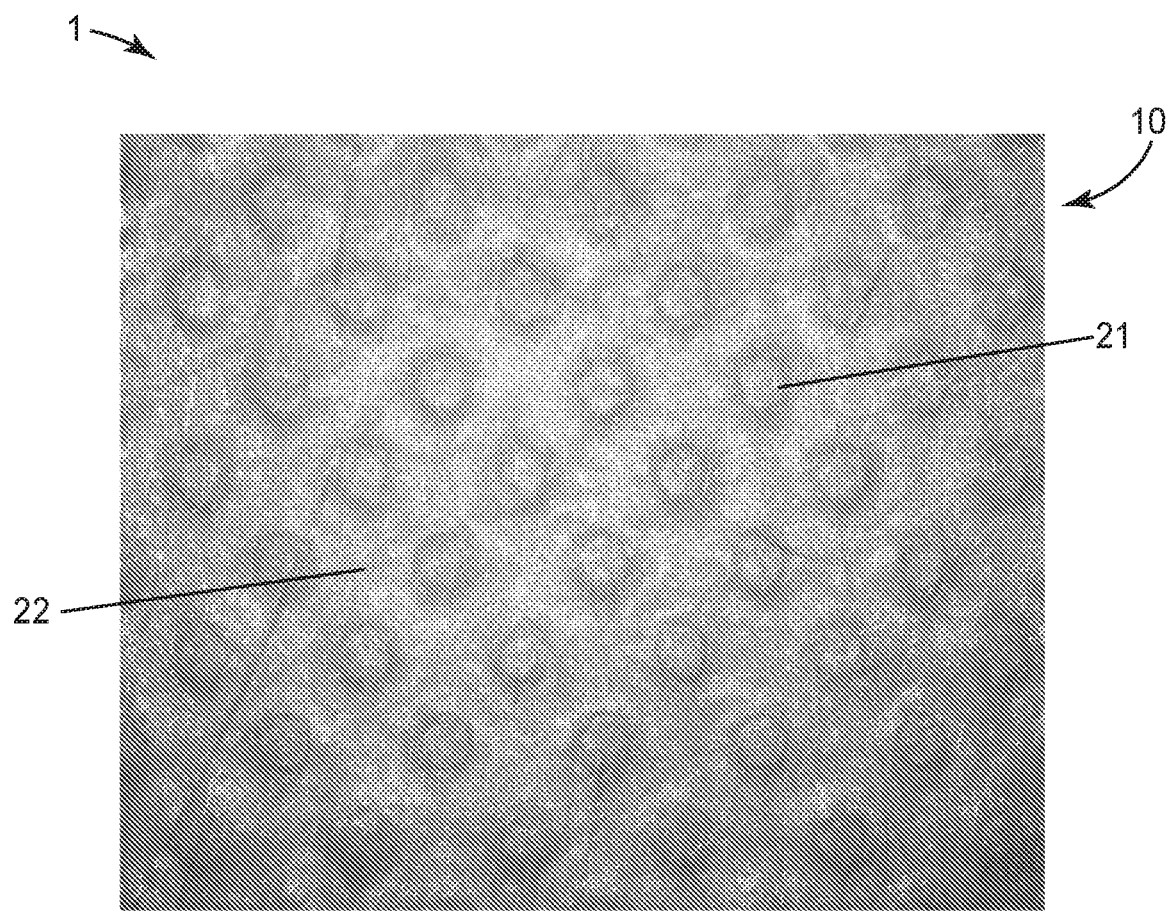
FIG. 10 is an optical photograph at one times magnification in top view, of a portion of an exemplary relofted, spunbonded nonwoven web.

The properties of a relofted web as imparted by a two-dimensional, discrete working pattern can be further discussed in relation to FIG. 10, which depicts a top view of a relofted web 10 from a Working Example. The web exhibits a somewhat dimpled appearance comprising areas 21 that protrude outward from surrounding "land" areas 22 of the relofted web. Characterization of this web and similar samples indicated that the increase in loft seemed to occur not merely at the very edges of areas 21 (e.g. at the locations that might have been expected to undergo the highest shearing force), Rather, the increase in loft seemed to extend into land areas 22 to at least some extent and also seemed to extend inward from the edges of areas 21 into the central portions of areas 21 to at least some extent. Thus, such processing has been found to perform relofting over a sufficiently high percentage (i.e., 30% or considerably more) of the total web area to achieve the effects discussed herein.

Although the depicted relofting apparatus and process of FIG. 9 may resemble, for example, a conventional apparatus and process for conventional web-embossing, it is emphasized that any actual degree of permanent deformation of the web may be rather small. For example, in a relofted web such as that of FIG. 10, any permanent displacement of an area 21 of the web outward from area 22, may be less than about 300, 200, or 100% of the thickness of "land" area 22. Thus, the processes as disclosed herein, and the resulting webs, are distinguished e.g. from processes that deform a substrate to provide very deep pockets that may extend outward a distance that is e.g. 1000% or more of the thickness of a land area of the substrate. In fact, in many embodiments the permanent deformation of the web may be less pronounced than that of the exemplary web shown in FIG. 10.

Moreover, the mechanical working/relofting disclosed herein is in contrast to embossing processes that permanently compress (i.e., densify and/or to reduce the thickness of) selected areas of a substrate. Rather, the present process serves to increase, rather than decrease, the loft of at least selected areas, while preserving, or at least slightly increasing, the loft of other areas. In the present process, no areas of the web will exhibit a significantly decreased loft. That is, with reference to FIG. 10, "land" areas 22 will not exhibit a loft that is lower than that of precursor web 9. Rather, areas 22 will at least retain their original loft or may exhibit at least slightly increased loft. It will thus be appreciated that, regardless of whether the working pattern is one-dimensional and continuous, or two-dimensional and discrete, the rolls will be arranged to maximize the loft-enhancing shearing force on the web while avoiding or minimizing any crushing that occurs e.g. in land areas 22 of the web. In particular, the mechanical working may be performed e.g. at room temperature or a slightly elevated temperature (e.g. less than 45° C.) that is low enough to ensure that no significant melting or consolidation of fibers occurs (noting that e.g. if the rolls are not actively temperature-controlled, some minor level of frictional heating may occur). Thus in at least some embodiments, a relofted air-filtration web 10 as disclosed herein will not comprise any compressed filter regions e.g. of the general type described in U.S. Patent Application Publication No. 2016/0067647. Moreover, mechanically worked areas as disclosed herein will be distinguished from, for example, embossments that are provided over a relatively small area of the web purely for purposes of providing structural support, providing attachment zones for receiving glue beads, and so on.

Numerous variations on the above-described approaches are possible. For example, it is not necessary that all of the male forming structures will be on one roll and all of the female structures will be on the opposing roll as in the exemplary arrangement of FIG. 9. Rather, in some embodiments each roll can have both male forming structures and female forming structures (e.g. as in FIGS. 5-8). The size and spacing of all such forming structures can be chosen so as to ensure that at least 30% of the area of the web is worked in the manner disclosed (for example, with regard to FIG. 9, the posts 302 and cavities 307 do not necessarily have to exhibit a diameter as large as that shown). Numerous shapes, spacings and arrangements of forming elements of intermeshing rolls that may be useful for relofting purposes are described in U.S. Pat. No. 9,067,357, which is incorporated by reference herein in its entirety for this purpose.

Rather than using a single pair of rolls, a web may be passed through multiple nips between various rolls, as desired. If desired, a web may be subjected to multiple passes (whether through successive in-line nips or by being repeatedly passed through a single nip). Any subsequent passes may be offset from a previous pass, e.g. in order to obtain an overall result that is more uniform that any single working pattern applied in any single pass.

The above-described mechanically-working relofting processes will not be expected to cause the formation of new fiber-fiber bonds or to cause a significant number of fiber entanglements that can serve as physical "bonds". Therefore, such a process should be performed in such manner that a sufficient number of fiber-fiber bonds remain to allow the relofted web to have sufficient mechanical integrity to be self-supporting as described earlier herein. Furthermore, the process should of course be performed in a manner that will not rip or tear through-holes in the web that would adversely affect the filtration performance.

A relofting process may be performed on any air-filtration web to which it is desired to impart improved filtration performance. However, it has been found that a relofting process (however performed) is particularly suited for being performed on a web that already possesses a relatively high loft. That is, relofting a high loft web has been found to significantly lower the Pressure Drop through the web, while having a small or negligible effect on the Percent Penetration of particles through the web. This results in a significantly improved Quality Factor. When relofting was performed on relatively low loft webs (e.g. with solidity of 10% or higher), the Pressure Drop was again significantly lowered; however, the Percent Penetration of particles through the web increased significantly. Thus, the Quality Factor, which takes both of these factors into account, was not significantly improved.

A relofting process as disclosed herein can thus take a relatively high-loft web and increase the loft to an even higher value, and in doing so can increase filtration parameters such as Quality Factor and Dust Holding Capacity. In various embodiments, a precursor web that is to be relofted may exhibit a solidity of less than 10.0, 9.0, 8.0, 7.0 or 6.0%. In various embodiments the relofting process may decrease the solidity by at least 0.1, 0.2, 0.5, 1.0, 1.5, 2.0, 2.5, or 3.0%. (This percentage is expressed in terms of the actual solidity itself; that is, if a precursor web of with a solidity of 8.0% is relofted to have a solidity of 6.5%, this is a decrease in solidity of 1.5%.) In various embodiments, a relofted web may exhibit a solidity of less than 9.0, 8.0, 7.0, 6.0, 5.0 or 4.0%. In further embodiments, a relofted web may exhibit a solidity of greater than 1.0, 2.0, or 3.0%. It is noted that a significant and useful increase in filtration performance, as characterized by Quality Factor, does not necessarily require a large decrease in the measured solidity. Thus, in some cases a solidity decrease as small as e.g. 0.2, 0.1, or even 0.05% may nevertheless correspond to a useful increase in Quality Factor. In various embodiments, a relofted air-filtration web may exhibit a Quality Factor of at least 0.5, 0.7, 1.0, 1.3, or 1.5.

A relofted web may comprise any suitable basis weight. In embodiments e.g. in which the relofting process is a mechanical working process has an overall spreading effect on the web, the basis weight may decrease slightly from that of the precursor web, otherwise the basis weight may remain relatively unchanged. In various embodiments, a relofted web may exhibit a basis weight of no more than 300, 200, 150, 100, 90, or 80 grams per square meter. In further embodiments, a relofted web may exhibit a basis weight of at least 30, 40, or 50 grams per square meter. It is noteworthy that relofting an already high-loft air-filtration web can impart a significant increase (e.g. by a factor of two or more, as evidenced by the Working Examples herein) in Dust Holding Capacity, without the web having to comprise a high basis weight (e.g. 100 grams per square meter or more) or having to comprise deeply embossed (e.g. bag-like) pockets. In various embodiments, a relofted air-filtration web may exhibit a Dust Holding Capacity of at least 30, 40, 50 or 60 grams per square meter.

As noted earlier, in some embodiments a relofted air-filtration web 10 may be pleated. Thus as shown in exemplary embodiment in FIG. 11, a relofted air-filtration web 10 may provide, or be a layer of, an air filter media 1 that is pleated to comprise pleats 401 and pleat tips 402. By "pleated" is meant a substrate (whether monolayer or multilayer) at least portions of which have been folded to form rows of generally parallel, oppositely oriented folds, as will be well understood by ordinary artisans. The pleating of an air-filtration media typically serves to increase the total surface area of the media that is available within a nominal (plane-projected) area; pleating typically does not significantly change inherent properties of the media such as e.g. loft and Percent Penetration of particles. Pleating (as well as related processes such as corrugating) is thus distinguished from the earlier-described processes of mechanically working of a web to increase the loft and to enhance properties such as Quality Factor. In the event that a filtration web that was relofted by being mechanically worked (e.g. the exemplary web shown in FIG. 10) is then pleated, any mechanical-working pattern that is present will not interfere with the pleating process but rather will simply be superimposed on the pleating pattern.

The pleat height and pleat spacing of the pleated web may be in any suitable range. Pleat height (pleat amplitude) is the distance from upstream tip to downstream tip, along a direction that is orthogonal to the overall major plane of the pleated web. In various embodiments, the pleat height can be at least 4, 6, 8, 10, 12, 14, 16, 18, 20, 30, or 40 mm. In further embodiments, the pleat height may be at most 110, 90, 70, 50, 35, 25 or 14 mm. Pleat spacing is the distance between nearest-neighbor same-side pleat tips, along a direction that is in the major plane of the filter media. In various embodiments the pleat spacing may be at most about 30, 25, 20, 15, 12, 10, 8, 6 or 4 mm. In further embodiments the pleat spacing may be at least about 3, 5, 7, 9 or 11 mm. The pleats may have any desired radius of curvature; for example they may be relatively sinusoidal in appearance or they may be relatively sharp-tipped.

Figure 11:
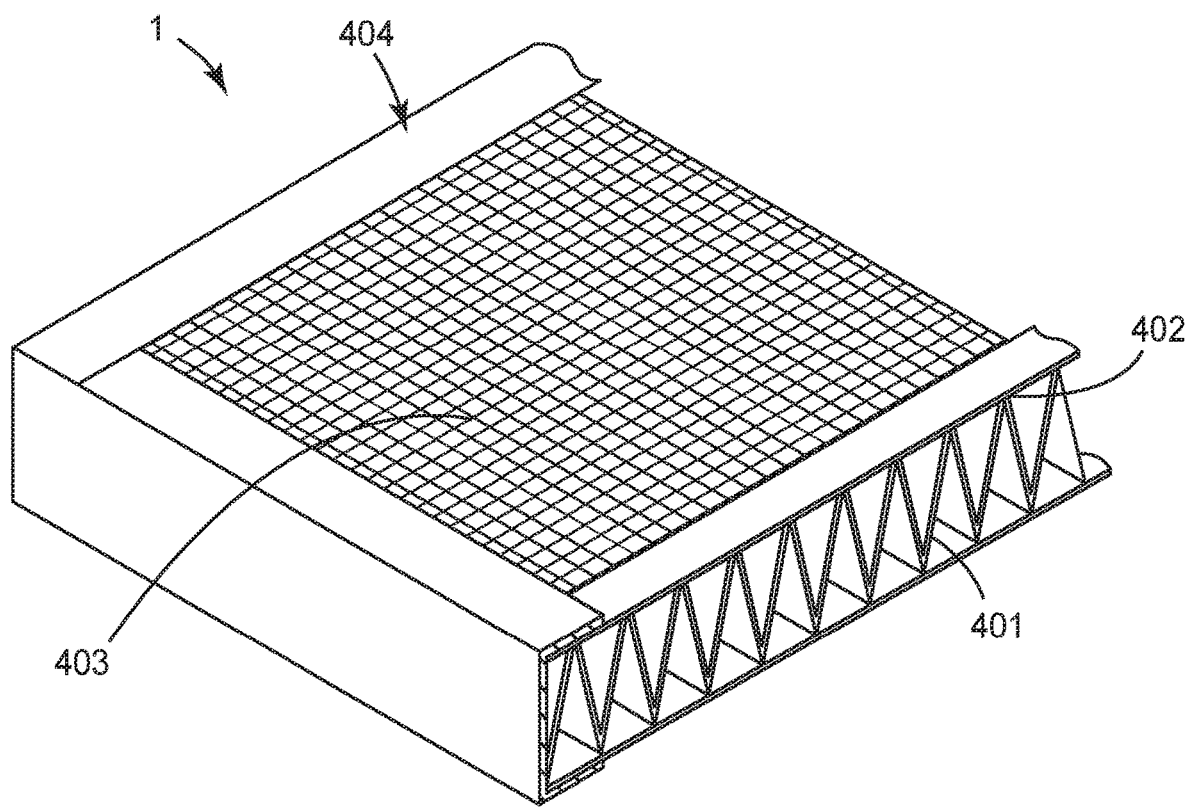
FIG. 11 is a perspective view of a portion of an exemplary air-filter media comprising a relofted, spunbonded nonwoven web as disclosed herein.

If desired, a pleated air filter media 1 (whether in the form of a relofted air-filtration web 10 alone, or in the form of a multilayer structure of which web 10 is a filtration layer), may be stabilized in any suitable manner. This may be particularly useful in the event that, for example, the relofting process appreciably lowers the stiffness of the media. Thus for example, in some embodiments an air filter media may be equipped with any suitable pleat-stabilizing item or items. In general, such items may take the form of members, strips, filaments, a collection of filaments, a perforated cardboard sheet, and so on. Such pleat-stabilizing items may be in contact with (e.g. bonded to) only the tips of the pleats (as with exemplary supporting scrim 403 as shown in FIG. 11); or, they may at least partially follow the pleats of the media and thus may be bonded to pleat walls and/or valleys as well. Pleat-stabilizing items of the former type might include e.g. paperboard strips, polymeric strands, and so on. Pleat-stabilizing items of the latter type might include e.g. wire meshes or chicken-wire type metal grids (e.g. that are applied to the filter media and then pleated along therewith), beads of drizzle glue that are applied to the pleated media, filaments that are extruded onto the surface of the media prior to being pleated, and so on.

In some embodiments, the pleated media may be provided with bridging filaments that are bonded to pleat tips of a major side of the pleated media so as to be in discontinuous contact with the media. In some embodiments, the bridging filaments may be of the general type described in U.S. Provisional Patent Application No. 62/346,179 and in PCT Patent Application Publication WO 2017/213926, both of which are incorporated by reference herein in their entirety for this purpose. In some embodiments, the pleated media may be provided with continuous-contact filaments that are in continuous contact with the pleated media (i.e., that are pleated along with the media). In some embodiments, the continuous-contact filaments may be of the general type described in U.S. Provisional Patent Application No. 62/714,186, entitled PLEATED AIR FILTER WITH REINFORCING FILAMENTS COMPRISING LOCALLY-THINNED BENDING ZONES, which is incorporated by reference herein in its entirety for this purpose.

If desired, a perimeter support frame 404 may be mounted on the major edges of an air filter media 1 (e.g. a pleated air filter media 1) that comprises a relofted air-filtration web 10, e.g. as shown in exemplary manner in FIG. 11. In FIG. 11 a portion of frame 404 has been omitted in order to show pleats 401; also, it is emphasized that FIG. 11 is an exemplary representation and that specific features of media 1 (e.g. the shape of pleat tips 402) may vary from that depicted. In many convenient embodiments an air filter media is rectangular (which terminology encompasses square shapes) with four major edges on which a perimeter support frame is mounted. Such a frame may provide support and rigidification so that the resulting framed air filter can be installed in a suitable location, e.g. in an air-return duct of an HVAC system, in a compartment of a room air purifier, and so on.

Ordinary artisans will appreciate that high-loft spunbond webs (in particular, very high-loft webs with a solidity of e.g. less than 6.0%) may be susceptible to compaction if they are e.g. rolled into a jumbo and held or stored in that condition while awaiting a next processing step. Such compaction may be long-lasting or permanent and may adversely affect the filtration performance. However, it can be cumbersome to operate a meltspinning/bonding process directly inline with pleating and/or framing. Therefore, it may be difficult to produce a high-loft spunbonded web and feed it directly into a pleating and/or framing process so that the loft is retained.

In contrast, operating a relofting process inline with a pleating and/or framing process can be relatively straightforward. Thus in some embodiments, the process of relofting an air-filtration web may be performed in-line with a process of pleating the web and/or a process of framing the web. This can advantageously allow a relofted web to be input directly into a process of pleating and/or framing, without the relofted web ever having to be rolled into a jumbo.

A relofted web as disclosed herein is by definition an air-filtration web. By this is meant that the relofted web is purposefully configured to perform particulate filtration of a moving gaseous stream, and is specifically meant that the relofted web exhibits a Quality Factor of at least 0.30. (All references to Quality Factor herein refer to a Quality Factor obtained by testing with dioctyl phthalate (DOP), unless otherwise specified). Such a relofted web may serve on a stand-alone basis as an air-filtration media; or, the relofted may be used as a filtering layer of a multilayer air-filtration media. A relofted air-filtration web will be distinguished from, for example, nonwoven webs that are configured as absorbent materials for imbibing liquids, e.g. for such applications as hygiene products, diaper components, cleaning wipes, and soon. In particular, a relofted air-filtration web that is charged in order to provide an enhanced ability to capture particles from an airstream will be distinguished from webs that are configured to absorb liquids.

In particular embodiments, a relofted air-filtration web (e.g. a charged web) will be at least essentially free of hydrophilic fibers, powders or the like (e.g. cellulosic pulp fibers as are often included in nonwoven webs to promote water absorption). As would be expected for an air-filtration web, in at least some embodiments a relofted air-filtration web will not comprise any through-holes, through-slits, through-apertures; or, in general, any passage that would allow airborne particles to pass through the web without encountering any fibers.

LIST OF EXEMPLARY EMBODIMENTS

Embodiment 1 is an air-filter media comprising a relofted, spunbonded nonwoven web exhibiting a solidity of from less than 8.0%, to at least 3.0%, and exhibiting a Quality Factor of at least 0.30.

Embodiment 2 is the air-filter media of embodiment 1 wherein the relofted web comprises a solidity of from less than 7.0% to at least 4.0%.

Embodiment 3 is the air-filter media of any of embodiments 1-2 wherein the relofted web comprises at least some meltspun fibers that are charged.

Embodiment 4 is the air-filter media of any of embodiments 1-3 wherein the relofted web comprises at least some meltspun fibers that are hydrocharged.

Embodiment 5 is the air-filter media of any of embodiments 1-4 wherein the relofted web comprises at least some meltspun, charged fibers that are monocomponent fibers.

Embodiment 6 is the air-filter media of any of embodiments 1-5 wherein the air-filtration web comprises a Quality Factor of at least about 0.70.

Embodiment 7 is the air-filter media of any of embodiments 1-5 wherein the web comprises a Quality Factor of at least about 1.0.

Embodiment 8 is the air-filter media of any of embodiments 1-7 wherein the relofted web comprises fiber-fiber bonds and also comprises broken fiber-fiber bonds.

Embodiment 9 is the air-filter media of any of embodiments 1-8 wherein the relofted web comprises multi-fiber area-bonds that are present at an area ratio of no more than 2.5%.

Embodiment 10 is the air-filter media of any of embodiments 1-9 wherein the relofted web is a pleated relofted web.

Embodiment 11 is the air-filter media of any of embodiments 1-10 further comprising a perimeter support frame mounted on each of four major edges of the air-filter media.

Embodiment 12 is the air-filter media of any of embodiments 1-11 wherein the relofted web is a mechanically worked web.

Embodiment 13 is the air-filter media of embodiment 12 wherein the mechanically worked web comprises a one-dimensional, continuous working pattern.

Embodiment 14 is the air-filter media of embodiment 12 wherein the mechanically worked web comprises a two-dimensional, discrete working pattern.

Embodiment 15 is a method of filtering a stream of flowing air, the method comprising passing the stream of flowing air through the air-filter media of any of embodiments 1-14.

Embodiment 16 is a process of relofting a spunbonded precursor web, the process comprising: mechanically working a spunbonded precursor web that comprises a solidity of no more than 10%, to produce a relofted, spunbonded air-filtration web comprising a solidity of from less than 8.0%, to at least 3.0%, and comprising a Quality Factor of at least 0.30.

Embodiment 17 is the process of embodiment 16 wherein the precursor web is mechanically worked in a one-dimensional, continuous working pattern imparted by passing the precursor web through a nip between first and second intermeshing rolls, each roll comprising elongated ridges and elongated valleys.

Embodiment 18 is the process of embodiment 17 wherein each roll comprises elongated ridges with long axes that are aligned with a crossweb dimension of the precursor web and elongated valleys with long axes that are aligned with the crossweb dimension of the precursor web.

Embodiment 19 is the process of embodiment 17 wherein each roll comprises elongated ridges with long axes that are aligned with a downweb dimension of the precursor web and elongated valleys with long axes that are aligned with the downweb dimension of the precursor web.

Embodiment 20 is the process of embodiment 16 wherein the spunbonded precursor web is mechanically worked in a two-dimensional, discrete working pattern imparted by passing the precursor web through a nip between first and second intermeshing rolls, wherein at least one of the rolls comprises discrete male forming elements and wherein at least one of the rolls comprises discrete female forming elements configured to receive the male forming elements of the other roll.

Embodiment 21 is the process of embodiment 20 wherein at least some of the male forming elements comprise a shape chosen from rectangular, square, circular, oval, triangular, diamond, pentagonal, or hexagonal, and wherein at least some of the female forming elements each comprise a shape that is complementary to the shape of a male forming element.

Embodiment 22 is the process of any of embodiments 16-21 wherein the relofting process is performed in-line with a subsequent process of pleating the relofted, spunbonded air-filtration web.

Embodiment 23 is the process of any of embodiments 16-22 wherein the relofting process is performed in-line with a subsequent process of mounting a perimeter support frame on major edges of the relofted, spunbonded air-filtration web.

EXAMPLES

Test Methods

Solidity and Loft

Solidity is determined by dividing the measured bulk density of the nonwoven fibrous web by the density of the materials making up the solid portion of the web. Bulk density of a web can be determined by first measuring the weight (e.g. of a 10-cm-by-10-cm section) of a web. Dividing the measured weight of the web by the web area provides the basis weight of the web, which is reported in g/m². The thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as g/m³.

The solidity is then determined by dividing the bulk density of the nonwoven fibrous web by the density of the material (e.g. polymer) comprising the solid filaments of the web. The density of a bulk polymer can be measured by standard means if the supplier does not specify the material density. Solidity is a dimensionless fraction which is usually reported in percentage.

Loft is usually reported as 100% minus the solidity (e.g., a solidity of 7% equates to a loft of 93%)

Percent (%) Penetration, Pressure Drop, and Quality Factor

Percent (Particle) Penetration, Pressure Drop and the filtration Quality Factor (QF) of the nonwoven fibrous webs are determined using a challenge aerosol containing DOP (dioctyl phthalate) liquid droplets, delivered (unless otherwise indicated) at a flow rate of 85 liters/min to provide a face velocity of 14 cm/s, and evaluated using a TSI (Registered Trademark) Model 8130 high-speed automated filter tester (commercially available from TSI Inc., Shoreview, Minn.). For DOP testing, the aerosol may contain particles with a diameter of about 0.185 μm, and the Automated Filter Tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments, Wilmington, Mass.) may be employed to measure the Pressure Drop (ΔP, mm H2O) through the filter. The equation:

$$QF = \frac{-\ln\left(\frac{\% \text{ Particle Penetration}}{100}\right)}{\Delta P}$$

may be used to calculate QF from the Pressure Drop and Percent (Particle) Penetration.

Dust Holding Capacity (DHC)

The Dust Holding Capacity (and other filtration properties such as e.g. Capture Efficiency, Arrestance, and Minimum Efficiency Reporting Value MERV)) of filters are measured in accordance with the general methods in ASHRAE Standard 52.2. ("Method of Testing General Ventilation Air-Cleaning Devices for Removal Efficiency by Particle Size"). The Dust Holding Capacity test involves configuring the web as a filter (e.g., a pleated and/or framed filter), installing the filter into a test duct and subjecting the filter to incremental dust loading steps, using a synthetic dust as specified in the ASHRAE 52.2 standard. The Dust Holding Capacity is the total weight of the synthetic dust captured by the air-filter sample over all of the incremental dust loading steps. In the present case, the samples that were tested for Dust Holding Capacity were pleated as described below. The Dust Holding Capacity for all samples is thus normalized to the surface area of the air-filter sample and is reported in grams of dust per square meter.

WORKING EXAMPLES

Representative Example

High-loft spunbonded webs were obtained. The meltspun fibers had been made and collected in general accordance with the procedures described in the Examples of U.S. Pat. No. 8,240,484. The collected fibers had been autogenously bonded to form self-supporting, spunbonded webs in general accordance with the procedures described in U.S. Pat. No. 9,976,771, and had also been area-bonding using calendering methods of the general manner described in the '484 patent. The area-bonds were estimated to be present at an area percentage of the web of approximately 1.5-1.6%. The webs had been hydrocharged in general accordance with the procedures disclosed in U.S. Patent Application Publication No. 2012/0017910. The webs were obtained in two grades, Grade 55 which exhibited a basis weight of approximately 55 grams per square meter and a solidity of approximately 7.5%; and, Grade 75, which exhibited a basis weight of approximately 75 grams per square meter and a solidity of approximately 7.9%. Both grades of material were obtained as flat-web samples.

The flat-web samples were mechanically worked using first and second intermeshing rolls each comprising a steel working face. The first roll comprised flat-topped, male forming elements that protruded radially outward; the second roll comprised female forming elements in the form of radially-inward recesses. The recesses were slightly oversized relative to the male forming elements to accept the male forming elements thereinto. Specifically, the male forming elements were flat-topped posts that were square in overall shape, approximately 3.8×3.8 mm in cross-sectional dimension, with smoothly rounded corners. The posts were approximately 3.7 mm in height (above the flat "land" area of the surface of the first roll), with the edges of the post-tops being slightly rounded. The female forming elements were flat-bottomed square recesses, approximately 5.3×5.3 mm in cross-sectional dimension, with smoothly rounded corners. The recesses were approximately 3.8 mm deep (below the flat "land" area of the surface of the second roll). The outermost edges of the female forming elements were slightly rounded. The posts of the first roll, and the recesses of the second roll, were arranged in square arrays at a center-to-center spacing of approximately 8 mm, arranged at an angle of approximately 45 degrees relative to the lateral axis of each roll. The first and second rolls were registered with each other and were operated so that as the rolls counterrotated the radially-outwardmost surfaces of the male forming elements extended into the recesses to provide an intermeshing distance estimated as being approximately 3.7 mm (in other words, the rolls were operated in a condition that was close to fully-engaged).

Web samples as described above were relofted by being passed through a nip between the first and second intermeshing rolls at room temperature and at line speeds that varied between approximately 2 centimeters to 30 centimeters per second. A typical resulting relofted web sample (Grade 75, in this case) is shown in FIG. 11 (the actual size of the web area shown in FIG. 10 is approximately 7 cm×6 cm). The thus-produced relofted nonwoven web exhibited protruding areas (areas 21 as denoted in FIG. 11) arranged in a generally square array with a nearest-neighbor center-to-center spacing of approximately 8 mm. The protruding areas typically protruded a distance of less than 1-2 mm outward from the major plane of the web. The relofting process typically did not significantly change the basis weight of the webs. The increase in loft of the web imparted by the relofting process was evident upon casual visual inspection. In particular, many of the area-bonded areas of the as-received web were no longer visible; rather, they seemed to have been obscured by fibers overlying these areas.

Solidity and Quality Factors for these relofted samples, along with the as-received webs, are presented in Table 1. Each data point is an averaged value for multiple measurements. As noted herein, all such measurements were obtained over macroscopic areas of the relofted web, encompassing both the protruding areas and the land areas therebetween; the results are thus overall values. The Dust Holding Capacity (DHC) for a relofted Grade 75 sample is also included. For the DHC test, the sample was pleated to form a pleated filter with an overall (nominal) size of 16 inches×20 inches, with a pleat height of 0.75 inches and a pleat density of approximately 1.1 pleats per inch. The "as-is" (non-relofted) Grade 75 control sample was similarly pleated.

TABLE 1

| Property | Sample | | | |
|---|---|---|---|---|
| | 55 | 55-Relofted | 75 | 75-Relofted |
| Solidity (%) | 7.5 | 4.6 | 7.9 | 5.9 |
| Quality factor 1/(mm H$_2$O) | 1.1 | 2.1 | 1.0 | 1.6 |
| Dust Holding Capacity (g/m$^2$) | — | — | 15 | 40 |

These relofted samples thus exhibited an enhancement (% increase, relative to the as-received samples) in Quality Factor, of from approximately 60% to approximately 90%. The relofted sample (Grade 75) that was tested for Dust Holding Capacity exhibited a very large enhancement in Dust Holding Capacity.

Variations

Two-Dimension Working Patterns

Samples of Grade 55 and Grade 75 webs were relofted using intermeshing rollers comprising other two-dimensional working patterns, under generally similar conditions to those described above. These relofted samples typically exhibited a Quality Factor enhancement in the range of 20% to 50%.

One-Dimensional Working Patterns

Samples of Grade 55 and Grade 75 webs were relofted using intermeshing rolls comprising a one-dimensional working pattern of the general type shown in FIGS. 5 and 6. That is, the rolls each comprised ridges and valleys that extended across the transverse width of the roll. Web samples were relofted by being passed through a nip between the first and second intermeshing rolls at room temperature. These relofted samples typically exhibited a Quality Factor enhancement in the range of 30% to 40%.

Figure 7:
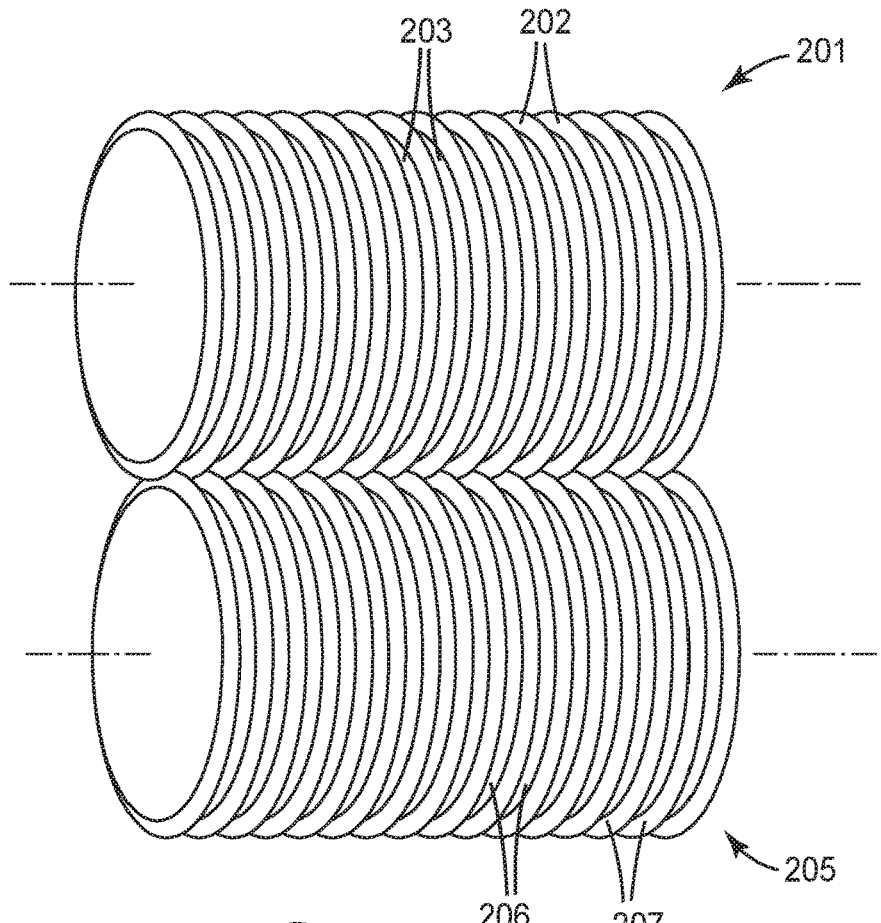
FIG. 7 is a perspective view of another exemplary pair of intermeshing rolls useful for relofting a spunbonded nonwoven web.
Figure 8:
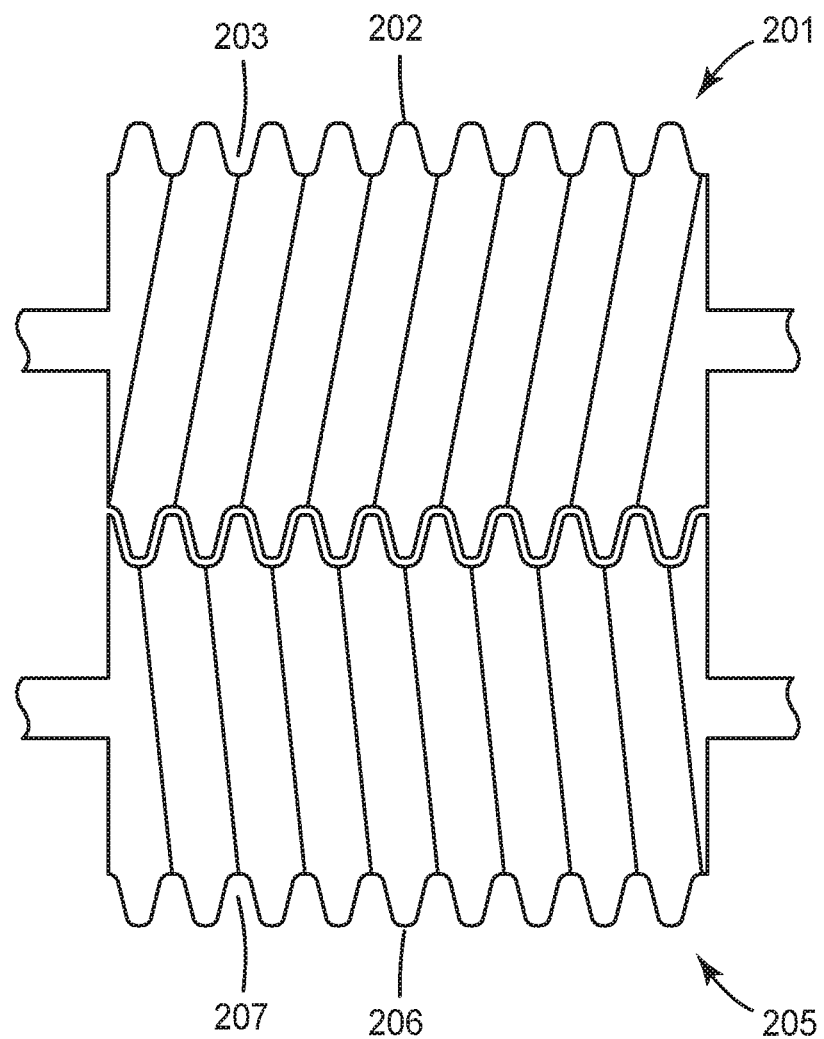
FIG. 8 is a side view of an exemplary pair of intermeshing rolls of the general type depicted in FIG. 7.

Samples of Grade 55 and Grade 75 webs were relofted using intermeshing rolls comprising a one-dimensional working pattern of the general type shown in FIGS. 7 and 8. That is, the rolls each comprised ridges and valleys that extended circumferentially around the roll. Web samples were relofted by being passed through a nip between the first and second intermeshing rolls at room temperature. These relofted samples typically exhibited a Quality Factor enhancement in the range of 20% to 30%.

Samples were relofted using a commercially available ring-rolling process line, in which multiple rings were arranged to collectively form an arrangement resembling the apparatus depicted in FIG. 10. The ring-rollers were configured at an intermeshing distance of approximately 7 mm (greater intermeshing distances resulted in tearing of the web). Due to the slight crossweb spreading nature of these ring-rollers as configured, the webs (which were similar to the above-described Grade 55 webs but had a basis weight of approximately 52 g/m$^2$) tended to be spread slightly by the relofting process, with the result that the overall basis weight typically dropped by anywhere from 10 to 30 percent as a result of the relofting process. These relofted samples typically exhibited a Quality Factor enhancement in the range of 30% to 40%. It is noted that these ring-rolled samples were tested for Percent Penetration/Pressure Drop→Quality Factor using NaCl particles rather than DOP particles. However, ordinary artisans would consider that the enhancement in Quality Factor found with NaCl would indicate that at least some enhancement would likely be found when tested with DOP.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used. It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. An air-filter media comprising a relofted, spunbonded nonwoven web exhibiting a solidity of from less than 8.0%, to at least 3.0%, and exhibiting a Quality Factor of at least 0.30.

2. The air-filter media of claim 1 wherein the relofted web comprises a solidity of from less than 7.0% to at least 4.0%.

3. The air-filter media of claim 1 wherein the relofted web comprises at least some meltspun fibers that are charged.

4. The air-filter media of claim 1 wherein the relofted web comprises at least some meltspun fibers that are hydrocharged.

5. The air-filter media of claim 1 wherein the relofted web comprises at least some meltspun, charged fibers that are monocomponent fibers.

6. The air-filter media of claim 1 wherein the relofted web comprises a Quality Factor of at least about 0.70.

7. The air-filter media of claim 1 wherein the relofted web comprises a Quality Factor of at least about 1.0.

8. The air-filter media of claim 1 wherein the relofted web comprises fiber-fiber bonds and also comprises broken fiber-fiber bonds.

9. The air-filter media of claim 1 wherein the relofted web comprises multi-fiber area-bonds that are present at an area ratio of no more than 2.5%.

10. The air-filter media of claim 1 wherein the relofted web is a pleated relofted web.

11. The air-filter media of claim 1 further comprising a perimeter support frame mounted on each of four major edges of the air-filter media.

12. The air-filter media of claim 1 wherein the relofted web is a mechanically worked web.

13. The air-filter media of claim 12 wherein the mechanically worked web comprises a one-dimensional, continuous working pattern.

14. The air-filter media of claim 12 wherein the mechanically worked web comprises a two-dimensional, discrete working pattern.

15. A method of filtering a stream of flowing air, the method comprising passing the stream of flowing air through the air-filter media of claim 1.

16. A process of relofting a spunbonded precursor web, the process comprising:
  mechanically working a spunbonded precursor web that comprises a solidity of no more than 10%, to produce a relofted, spunbonded air-filtration web comprising a solidity of from less than 8.0%, to at least 3.0%, and comprising a Quality Factor of at least 0.30.

17. The process of claim 16 wherein the precursor web is mechanically worked in a one-dimensional, continuous working pattern imparted by passing the precursor web through a nip between first and second intermeshing rolls, each roll comprising elongated ridges and elongated valleys.

18. The process of claim 17 wherein each roll comprises elongated ridges with long axes that are aligned with a crossweb dimension of the precursor web and elongated valleys with long axes that are aligned with the crossweb dimension of the precursor web.

19. The process of claim 17 wherein each roll comprises elongated ridges with long axes that are aligned with a downweb dimension of the precursor web and elongated valleys with long axes that are aligned with the downweb dimension of the precursor web.

20. The process of claim 16 wherein the spunbonded precursor web is mechanically worked in a two-dimensional, discrete working pattern imparted by passing the precursor web through a nip between first and second intermeshing rolls, wherein at least one of the rolls comprises discrete male forming elements and wherein at least one of the rolls comprises discrete female forming elements configured to receive the male forming elements of the other roll.

21. The process of claim 20 wherein at least some of the male forming elements comprise a shape chosen from rectangular, square, circular, oval, triangular, diamond, pentagonal, or hexagonal, and wherein at least some of the female forming elements each comprise a shape that is complementary to the shape of a male forming element.

22. The process of claim 16 wherein the relofting process is performed in-line with a subsequent process of pleating the relofted, spunbonded air-filtration web.

23. The process of claim 16 wherein the relofting process is performed in-line with a subsequent process of mounting a perimeter support frame on major edges of the relofted, spunbonded air-filtration web.

\* \* \* \* \*